United States Patent [19]

Minnich et al.

[11] Patent Number: 5,229,698
[45] Date of Patent: Jul. 20, 1993

[54] METHOD AND APPARATUS FOR SUB-SPAN INTERPOLATION

[75] Inventors: Thomas Minnich, Franklin; Alfred H. Morser, Cincinnati, both of Ohio

[73] Assignee: Cincinnati Milacron Inc., Cincinnati, Ohio

[21] Appl. No.: 563,366

[22] Filed: Aug. 6, 1990

[51] Int. Cl.$^5$ .............................. G05B 19/42
[52] U.S. Cl. ................ 318/568.15; 318/571; 318/573; 364/474.31; 364/164
[58] Field of Search ................ 318/560–636; 364/474.10–474.32; 395/80–99; 901/3, 5, 9, 12, 13, 15–23

[56] References Cited

U.S. PATENT DOCUMENTS

| | | | |
|---|---|---|---|
| 3,748,563 | 7/1973 | Pomella et al. | 318/573 |
| 3,857,025 | 12/1974 | English et al. | 235/151.11 |
| 3,860,805 | 1/1975 | Strukel | 235/152 |
| 3,969,615 | 7/1976 | Bowers et al. | 235/151.11 |
| 4,243,924 | 1/1981 | Onoda et al. | 318/573 |
| 4,262,336 | 4/1981 | Pritchard | 364/474 |
| 4,550,383 | 10/1985 | Sugimoto | 318/573 X |
| 4,648,024 | 3/1987 | Kato et al. | 318/573 |
| 4,672,190 | 6/1987 | Rostkowski et al. | 318/577 X |
| 4,683,543 | 7/1987 | Hirasawa et al. | 318/573 |
| 4,689,756 | 8/1987 | Koyama et al. | 318/573 X |
| 4,835,710 | 5/1989 | Schnelle et al. | 318/574 X |
| 4,858,140 | 8/1989 | Buhler et al. | 318/573 |
| 4,879,663 | 11/1989 | Fueherer | 318/573 |
| 4,914,363 | 4/1990 | Stelzer et al. | 318/568.1 |

Primary Examiner—Paul Ip
Attorney, Agent, or Firm—John W. Gregg

[57] ABSTRACT

A method and apparatus for machine member motion control are provided which reduce position path errors in sampled data motion control systems. Position commands defining locations of a moveable machine member are periodically produced at a predetermined interval as is conventional in sampled data motion control. Intermediate position commands are produced at a predetermined sub-interval less than the predetermined interval in response to a parametric function relating member position and time, the parametric function being continuous through positions defined by the position commands. The intermediate position coordinates are computed as the sum of products of coefficients and coordinates of selected member position commands. To reduce processing time, the coefficients are computed and stored in advance of execution of motion for recall as motion progresses. Where a parabolic function is used to produce intermediate position commands, the sum of products of coefficients and, respectively, past, present and target coordinates are used to compute intermediate positions between the present and target positions.

34 Claims, 5 Drawing Sheets

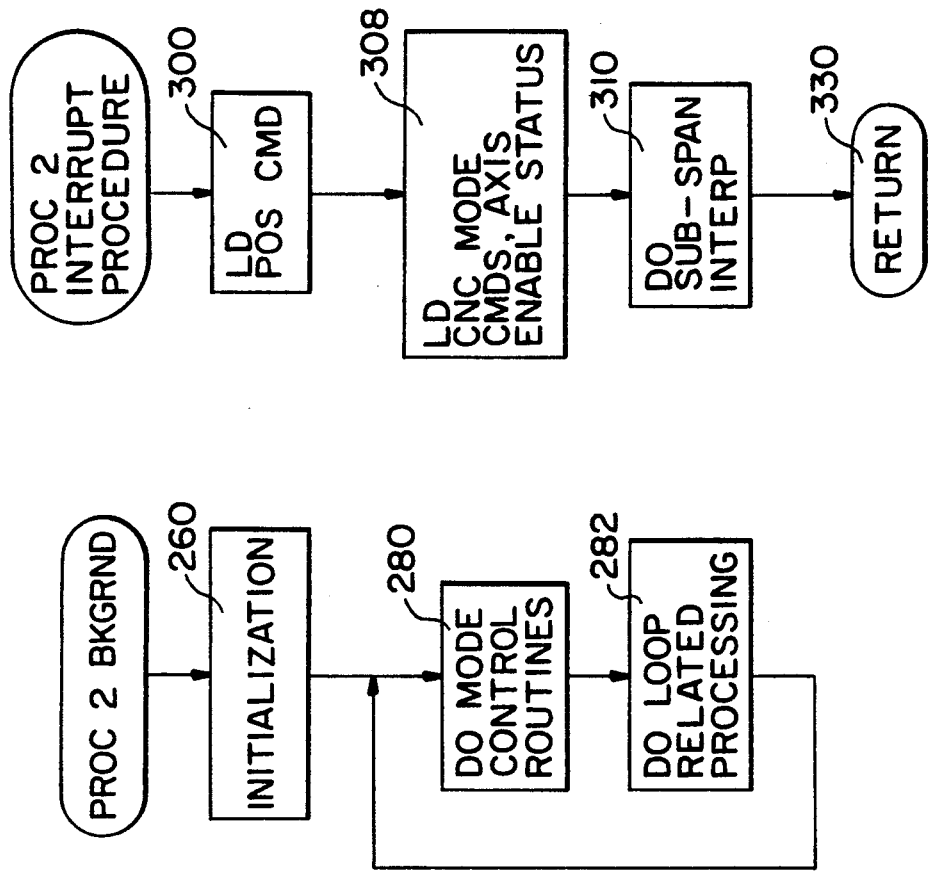
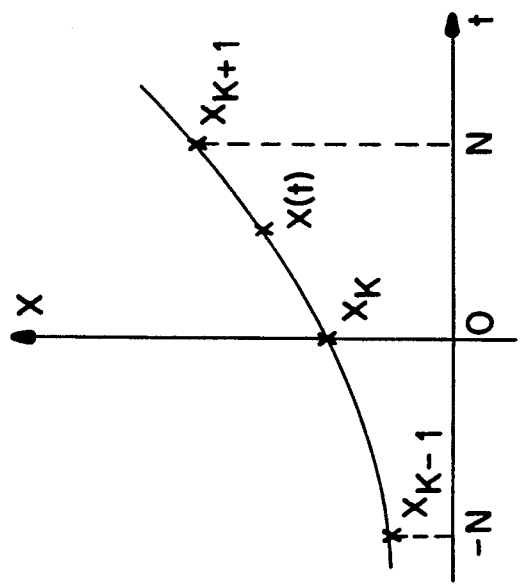

METHOD AND APPARATUS FOR SUB-SPAN INTERPOLATION

BACKGROUND OF THE INVENTION

I. Field of the Invention

This invention relates generally to numerical control of machines. In particular, this invention relates to control of motion of machine members to effect relative motion of a workpoint along a predetermined path.

II. Description of the Prior Art

Of particular interest herein is coordinated motion of plural members of a machine such as machine 10 shown in FIG. 1. Members 12, 14, and 16, each movable along a linear axis, such as the X, Y, and Z axes shown, may be controlled such that workpoint 18 is caused to move along a path in the course of performing work on workpiece WPC. Linear paths are typically defined by path end points represented by sets of coordinates of the orthogonal X, Y, and Z axes. Circular paths are defined by a combination of path end points and circle center data. In the prior art, motion along a path is achieved by interpolating intermediate points on the path at a predetermined repetition rate and controlling motion of the machine members in response to the intermediate points. Control of actuators effecting motion of the machine members is achieved by subdivision of in-axis changes of position into sub-increments according to a position control loop closure interval.

The prior art technique may result in a path error between the desired path and the actual path commanded by the subdivision of the in-axis changes of position. For example, FIG. 2 illustrates the actual path of motion when the prior art technique is employed to effect arcuate motion by orthogonal linear machine axes. Between intermediate points $P_{k-1}$ and $P_k$ the workpoint 18, advanced through linear sub-increments, follows the chord L1 connecting the intermediate points. This results in deviation from the desired arcuate path C1. The path error $\delta$ is:

$$\delta = P_p - P_{chd}$$

Where:

$P_p$ = coordinates of midpoint of curve C1
$P_{chd}$ = coordinates of midpoint of chord L1

The chords may have lengths of several sub-increments resulting in an unacceptably large path error $\delta$ when the desired arcuate path is of relatively small radius. While path error is conveniently illustrated with reference to orthogonal machine members effecting arcuate motion, it will be appreciated that other machine constructions, for example industrial robots including pivoting links, will, when effecting motion of a workpoint on linear paths, likewise produce path errors when the in-axis changes of position are linearly subdivided in time between intermediate path points. In general path errors which are of interest herein arise from the use of linear sub-span interpolation in instances when the changes of position required to follow a desired path are nonlinear with respect to time.

SUMMARY OF THE INVENTION

It is an object of the present invention to provide control of motion of a machine member to effect motion of a workpoint on a predetermined path by sub-span interpolation of intermediate points defined by a time based polynomial function joining member position coordinates of successive points on the path.

It is a further object of the present invention to provide control of motion of a machine member to effect motion of a workpoint along a path by sub-span interpolation defined alternatively by time based linear and nonlinear functions joining member position coordinates of successive path points.

It is a further object of the present invention to control motion of a machine member to effect motion of a workpoint along a predetermined path by sub-span interpolation of member position coordinates intermediate of path points, the intermediate position coordinates being calculated as the sum of products of coefficients of a parametric function of time and selected coordinates of member positions, the parametric function joining coordinates of member positions at successive path points and the coefficients being advantageously precomputed.

It is a further object of the present invention to control motion of a plurality of machine members in response to position commands representing points on a path intermediate of successive path points, the intermediate points calculated from a predetermined parametric function of time joining the successive path points for each of the machine members employed in effecting motion of a workpoint on the path.

Further objects and advantages of the present invention shall become apparent from the accompanying drawings and the following description thereof.

In accordance with the aforesaid objects a method and apparatus are provided for controlling motion of machine members to effect motion of a workpoint on a predetermined path. Path point coordinates specifying machine member locations on a predetermined path are periodically produced at a predetermined time interval. For each machine member employed to effect the desired motion of the workpoint, positions intermediate the path points are calculated from a time based sub-span interpolation procedure. This procedure produces intermediate position coordinates separated in time by a sub-interval less than the predetermined time interval. Sub-span interpolation is selectively performed in accordance with time based linear and nonlinear functions, the nonlinear function defined by a parabola joining the past, present, and target path points. The parabola is expressed as the sum of products of time variant coefficients and machine member coordinates at the selected path points. The coefficients are precomputed for all sub-intervals and recalled as required to reduce the time required to calculate intermediate position coordinates.

BRIEF DESCRIPTION OF THE DRAWINGS

FIG. 3 illustrates the machine member motion control effected by the present invention.

FIGS. 6a and 6b are flow charts of routines executed by the signal processing module of FIG. 5 to effect motion control as illustrated in FIG. 3.

DESCRIPTION OF THE PREFERRED EMBODIMENT

In order to illustrate the present invention, a computer numerical control (CNC) constituting a preferred embodiment shall be described in detail. This control corresponds to the Acramatic 950 control available from Cincinnati Milacron Inc., the assignee of the present invention. A servo mechanism control implementing the machine member motion control of the present invention is intended for use with such a CNC. While the preferred embodiment shall be described in considerable detail, it is not the intention of applicants to limit the scope of the invention to such detail. Rather it is intended that the scope of the invention be defined by the appended claims together with all equivalents thereto.

Figure 1:
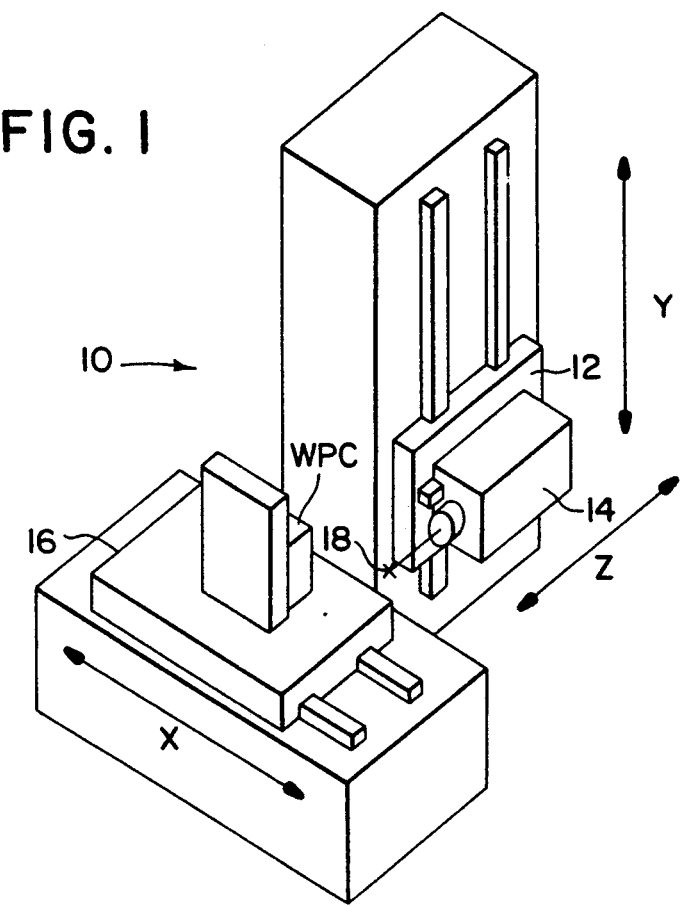
FIG. 1 illustrates a machine having moveable members to be controlled in the course of producing a finished workpiece.
Figure 2:
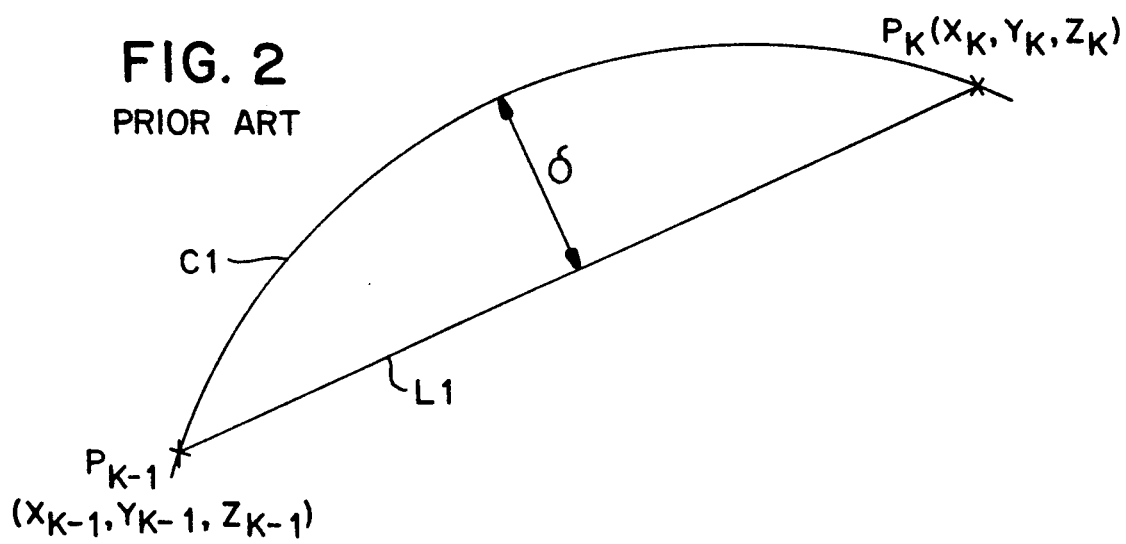
FIG. 2 illustrates the path error arising from the prior art control technique.

To eliminate or reduce the path error $\delta$ described with reference to FIG. 2, it is desired to produce additional intermediate points between the successive intermediate points $P_i$. Because the path generator producing these points controls path related functions such as acceleration, deceleration, and path modification, it is not practical to simply increase the repetition rate at which intermediate path point coordinates are produced. As described with reference to FIG. 2, linear subdivision of the in-axis change of position magnitudes to produce the ultimate position commands to the machine servomechanisms produces points lying on a chord rather than the desired path.

It will be recognized by those skilled in the art that any path of motion in orthogonal space may be described alternatively as parametric functions of time in each axis. Therefor, successive positions of, for example, the X axis member may be described in terms of a time based polynomial curve connecting a predetermined number Q of axis positions X lying on the path (path points). The polynomial curve may be subdivided in time to produce position data intermediate of the path points. As each successive path point is generated, the polynomial representation of the curve may be reevaluated using the values of the last Q axis positions to produce new position data for intermediate positions lying between the last two successive path points.

Applicants have chosen to use a time based parabolic function as shown in FIG. 3 for the production of position data intermediate the path points. The parabolic curve is subdivided into an arbitrarily chosen number N of equal sub-intervals of time t, where N is two (2) or more. The parabolic curve is defined by three successive path points separated by equal time intervals defined by, for example, a position update interval of a machine control. Since the three positions are equally spaced in time, the previous position $X_{k-1}$ is conveniently assigned to time -N, the present position $X_k$ is assigned to time O, and the target position $X_{k+1}$ is assigned to time N. The parabolic curve relates position and time according to:

$$X(t) = At^2 + Bt + C \tag{1}$$

Where the coefficients A, B, C satisfy the known conditions:

$$X(0) = X_k$$
$$X(-N) = X_{k-1}$$
$$X(N) = X_{k+1}$$

From equation (1) and the known conditions, the coefficients are determined to be:

$$A = (X_{k-1} - 2*X_k + X_{k+1})/2*N^2 \tag{2}$$
$$B = (X_{k+1} - X_{k-1})/2*N \tag{3}$$
$$C = X_k \tag{4}$$

By substituting for A, B, and C from equations (2), (3), and (4) into equation (1), and grouping terms, the expression for X(t) becomes:

$$X(t) = [(t^2 - Nt)/2*N^2]*X_{k-1} + \\ (1 - 2*t^2/2*N^2)*X_k + [(t^2 + Nt)/2*N^2]*X_{k+1} \tag{6}$$

The same expression is applicable to the other orthogonal axes Y and Z by substitution of the previous, present and target positions of each axis into equation (6) to obtain values for Y(t) and Z(t). The previous, present and target positions are known with each repetitive production of intermediate point coordinates by a conventional path generator as previously described. The coefficients of these quantities appearing in equation (6) may be calculated at the rate of occurrence of sub-intervals of t. However, since the values are constant for any value of N, applicants have chosen to store values for these coefficients for each t in look-up tables for recall as time advances from t to N−1. The calculation of each X(t) is thereby greatly simplified and processing time is minimized.

Figure 4:
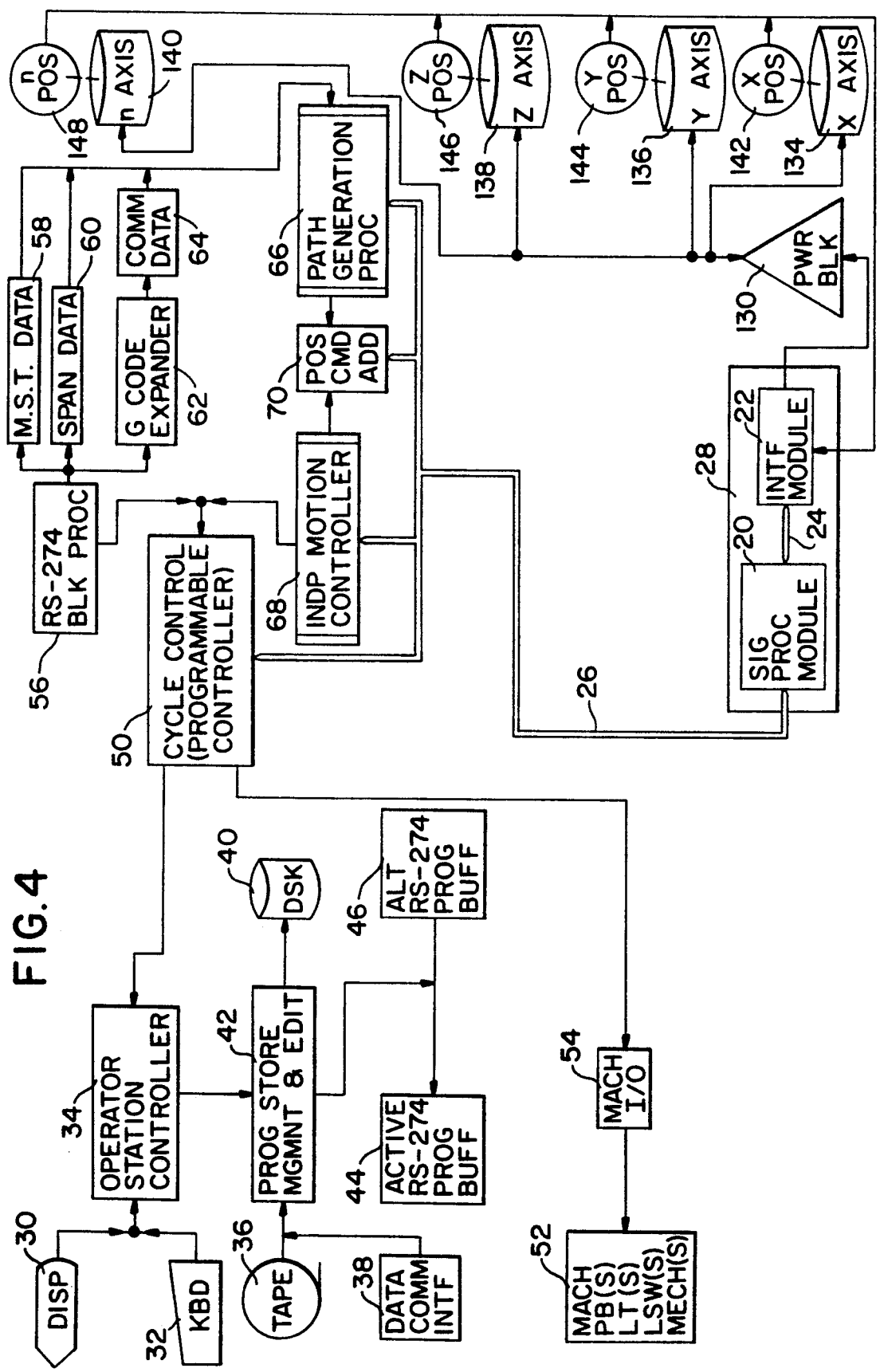
FIG. 4 is a block diagram of a machine control for effecting motion control in accordance with the present invention.

As previously stated, applicants have implemented the control technique illustrated by FIG. 3 in a servomechanism control intended for use with a computer numerical control (CNC). The CNC generates path point data at a predetermined update interval in response to input data supplied in, for example, a numerical control program. The CNC, illustrated by the block diagram of FIG. 4, includes: an operator or user interface; machine mechanism interface and control; program storage and edit facilities; machine cycle control; workpiece program interpretation; and, path generation control.

The operator interface includes a display device 30 such as a CRT or other alphanumeric display device, a manual data entry device such as keyboard 32 and an operator station controller 34. The operator station controller receives data to be displayed from the NC system processors and formats the data for the display device 30. Manual data entries from the keyboard 32 are encoded by operator station controller 34 for distribution to other numerical control system elements. Operator station controller 34 enables manual data input in accordance with the active mode of operation of the machine as determined by the machine cycle control.

In addition to manual data input, workpiece programs may be entered into local storage of the control by means of bulk data transfer devices such as, for example a tape reader 36 or a data communication interface 38. Bulk storage of workpiece programs is provided on disk store 40. A program storage and edit controller 42 manages the communication of data from the input devices 36 and 38 to and from the bulk store 40 as well as to and from the operator station controller 34. Two workpiece program buffers 44 and 46 are provided for active and alternative workpiece programs. Program instructions are transferred for execution from the active buffer 44. The alternative buffer 46 provides storage for a program which may be edited while execution of a program goes forward.

The overall cycle of operation of the CNC is controlled by the cycle control 50. Cycle control 50 operates as a conventional programmable controller to execute control programs relating machine push buttons, lights, limit switches and mechanisms such as transmissions, tool changers, workpiece transfer devices and so forth with the cycle of operation of the controlled machine. The machine elements are indicated generally by block 52 and are monitored and controlled through a machine input-output interface 54. In control of the cycle of operation of the machine, cycle control 50 effects transfer of workpiece program instructions from the active buffer 44 to a block processor 56. Further, cycle control 50 monitors the machine status and effects the appropriate response to error conditions.

Workpiece programs consist of blocks of instructions containing data defining position axis coordinates, feed rates, tool selections, spindle speeds, miscellaneous functions and cycle control codes. These programs are created to conform to a known programing convention, such as EIA RS 274. The block processor 56 decodes each block of instructions and distributes the data as appropriate for control of machine functioning. Miscellaneous function, spindle speed and tool data associated with machine functions such as tool selection, transmission speed changes and mechanism control are placed in the data store 58. Coordinate data specifying end points for the machine member axes of motion are placed in the data store 60. Code expander 62 operates on cycle control codes to effect selection of commissioning data from the commissioning data store 64 and to select the desired mode of path generation.

Path generation processor 66 produces coordinate axis position commands for each machine position update interval in accordance with the machine operations specified by the active workpiece program instructions. The position commands $X_k$, $Y_k$, and $Z_k$ produced by path generation processor 66 reflect the rate of change of position of all machine axes as defined by the programmed coordinates, feed rates, and cycle commands. Cycle control codes for path generation selection may be used to control the method of sub-span interpolation effected by servomechanism control 28.

In addition to path generation processor 66, coordinate axis position commands may be generated by an auxillary span generator 68. Auxillary span generator 68 produces axis motion commands in accordance with machine activity as specified by the machine builder such as, for example, motions to predetermined locations to effect tool or workhead changes or in response to operator input. While it is not customary for such motions to be executed simultaneously with motions commanded by a workpiece program, the auxillary motion commands are summed with motion commands produced in response to the workpeice program coordinates at position command summer 70 resulting in net motion commands. The result of this summation is then output to the servomechanism control 28.

Servomechanism control 28 effects closed loop control of the machine member actuators such as motors 134 through 140. Control of motor current is performed via power switches at power block 130 in response to control signals generated by servomechanism control 28. Actual position of the actuators is measured by position transducers 142 through 148 mechanically driven directly or indirectly by, respectively, motors 134, 136, 138, and 140. Servomechanism control 28 includes a signal processing module 20 and an interface module 22. The interface module 22 does not form a part of the present invention and no further details thereof shall be given herein.

The signal processing module 20 of servomechanism control 28 performs sub-span interpolation to produce axis position data intermediate the path points generated by the CNC in accordance with the technique illustrated by FIG. 3. In addition, signal processing module 20 calculates position loop following errors, i.e., the difference between commanded position and actual position for each position loop closure interval, calculates velocity commands in response to the following errors, and produces current commands to control motor velocities. Current command signals for each motor being controlled are periodically loaded to registers in interface module 22 which provides control signals for the power switches of power block 130.

Data is exchanged between the CNC and the digital signal processing module 20 over a system data bus 26. In applicants' preferred embodiment communication between the servomechanism control 28 and the CNC is accomplished over a data bus conforming to the signal specification of IEEE Standard 796-88 for the P1 connector. Data entered under control of the operation station controller 34 or from the workpiece program as well as data from commissioning data store 64 are all available over data bus 26 to the servomechanism controller 28. Data is exchanged between the digital signal processing module 20 and the interface module 22 via a dedicated servo control bus 24 providing independent data and address lines.

Signal processing module 20 shall be described with reference to FIG. 5. Signal processing module 20 uses digital signal processors 80 and 86 to perform the calculations to generate the sub-span position coordinates and current command signals for controlling machine member actuators such as motors 134 through 140. Applicants have chosen the TMS 320C25 digital signal processors available from Texas Instruments Inc. Programs executed by signal processor 80 are stored in local read only memory 84 and include: actual position calculation routines 200; position loop control routines 202; velocity loop control routines 204; and, hardware monitoring routines 208. Signal processor 86 operates in conjunction with programs stored in memory 90 including: mode and enable command processing routines 212; sub-span interpolation routines 216; initialization routines 220; and, mode change control routines 224.

The signal processors 80 and 86 include built-in address and data busses which are independently connected to the system busses as will be further described herein. The data bus 26 provides separate signal lines for address data exchanged through the system bus address driver 72. System bus data is exchanged through data transceiver 74. System data bus 26 provides additional signal lines for interrupt signals which are connected at the interrupt interface 76. Local memory to support the exchange of data over the bus is provided in a random access memory 78. Data associated with servo system bus 24 is exchanged through the data transceiver 92 and servo system bus addresses are exchanged through the address driver 94.

Figure 5:
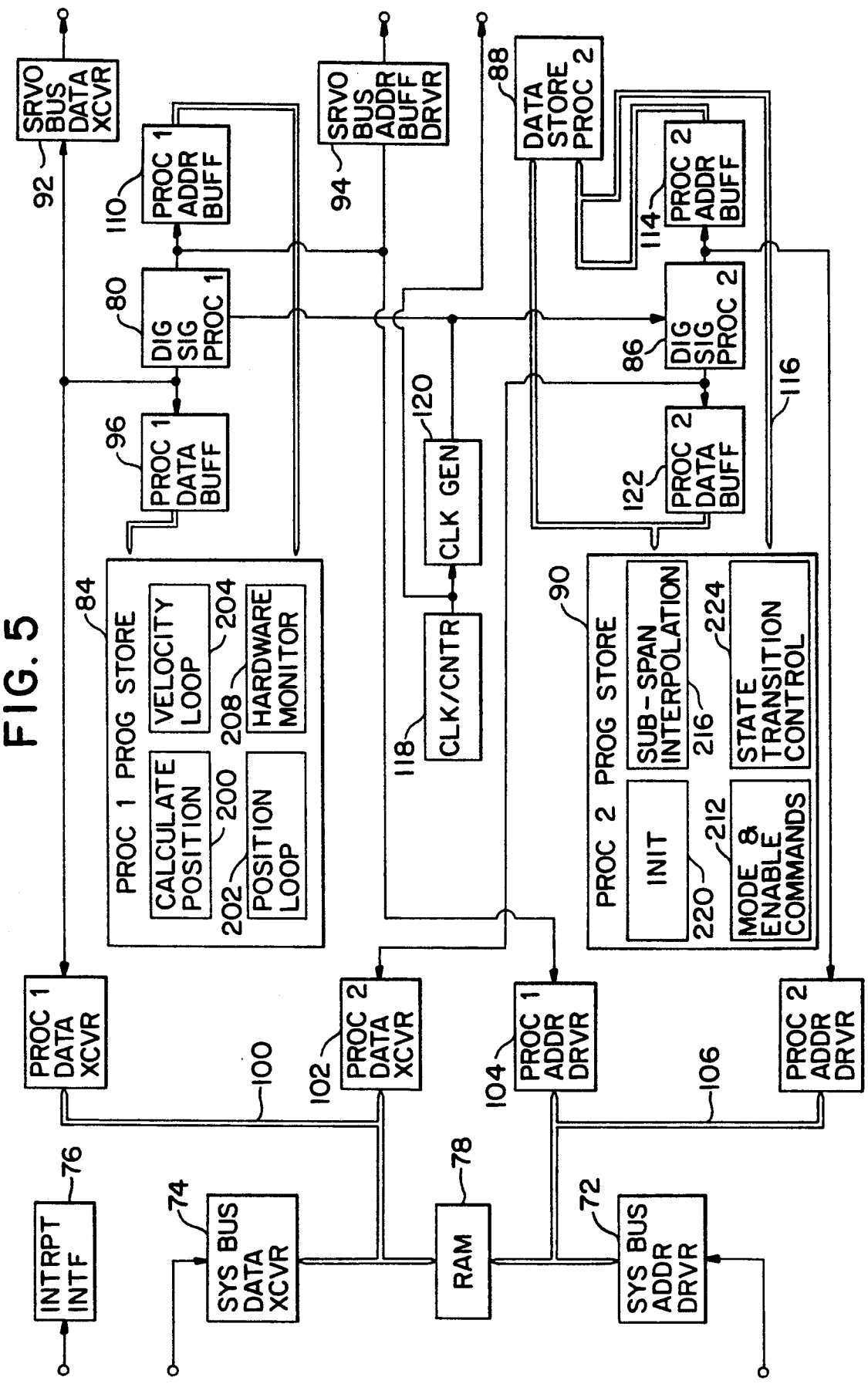
FIG. 5 is a block diagram of the signal processing module of the motor control shown in FIG. 4.

Continuing with reference to FIG. 5 and considering signal processor 80, address buffer 110 is interposed between the address bus of signal processor 80 and the immediate address bus 112 serving program store 84. In a like manner address driver 104 is interposed between the address bus of signal processor 80 and a local address bus 106 serving system bus address driver 72 and memory 78. A data bus buffer 96 is interposed between the data bus of signal processor 80 and program store 84. Data transceiver 98 is interposed between the signal processor 80 data bus and a local data bus 100 serving system bus data transceiver 74 and memory 78. The address and data busses of processor 80 are connected to, respectively, servo system address buffer 94 and servo system data transceiver 92. Functions performed by signal processor 80 are primarily directed to position and velocity loop control associated with generation of current command signals, hence the direct connection to the servo system bus through transceiver 92 and buffer 94. Since these functions do not form a part of the present invention, further details thereof shall not be given herein.

Considering processor 86, address driver 108 is interposed between the address bus of signal processor 86 and the local address bus 106 serving the system address driver 72 and memory 78. Address buffer 114 is interposed between the address bus of signal processor 86 and the immediate address bus 116 connecting data store 88 providing storage for variable data used by processor 86 and program store 90. Data buffer 122 is interposed between the data bus of signal processor 86 and the data channels of data store 88 and program store 90. Data transceiver 102 is interposed between the data bus of signal processor 86 and the local data bus 100 serving system data bus transceiver 74 and memory 78.

Continuing with reference to FIG. 5, an oscillator and counter 118 produce outputs which are decoded as clock signals by the clock generator 120. These clock signals control the rate of execution of programs by the processors 80 and 86 and define predetermined time intervals assumed in the calculation of current command signals and the sub-intervals of sub-span interpolation.

Functions performed by signal processor 86 include sub-span interpolation. The operation of processor 86 shall be described with reference to the flow charts of FIGS. 6a, 6b, 7a, and 7b. Processing performed by signal processor 86 shall be described as background processing which is performed continuously until the occurrence of an interrupt signal and interrupt procedure processing. The interrupt procedure processing of interest herein occurs in response to an interrupt generated by the clock generator 120 associated with the servomechanism loop closure interval.

A flow chart of the procedure for background processing performed by processor 86 is illustrated in FIG. 6a. At process step 260 initialization routines are executed when the state of the servomechanism controller as determined by the state transition control routines 224 demands initialization of data in preparation for servo operation. The initialization routines include calculation of values used in conjunction with the execution of parabolic sub-span interpolation procedures. Upon completion of the initialization routines, the background program processing continues with execution of an endless loop including the execution of mode control routines 224 at process step 280. The mode control routines 224 effect control over the transition of the servomechanism control 28 between predefined control states by providing for verification of all conditions required to proceed from control state to control state. These routines control the application and removal of power to the controlled actuators in accordance with commands produced by the CNC and the instantaneous conditions of the servomechanism controller. Other background processing routines perform functions associated with servomechanism loop control and are indicated generally by process step 282. Details of these routines do not form a part of the present invention and shall not be described herein. Processing of the endless loop including process steps 280 and 282 continues until the occurrence of an interrupt.

Interrupt procedure processing shall be described with reference to FIG. 6b. Process step 300 loads the position commands produced by the CNC to local memory from memory 78. These position commands are used by the sub-span interpolation procedures to produce coordinates of intermediate positions of the machine members. At process step 308 mode command data and axis enable status data from the CNC are loaded to local memory. These data include the servo type, ie., velocity or position, flags indicating which of the controlled motors are enabled, and the cycle control data used to select the type of sub-span interpolation to be effected.

Interrupt procedure processing continues with execution of the sub-span interpolation routines 216 at process step 310. Sub-span interpolation effects the reduction of change of position commanded by the numerical control at the update interval into sub-increments to be output as position commands POS $CMD_I$ at the loop closure interval. The update interval of the numerical control is effectively subdivided into the loop closure interval of servomechanism control 12 to produce incremental position commands for the position loop servos. For sub-span interpolation along a straight line the algorithm to produce position commands is as follows:

$$POS\ CMD_I = X_k + S^*(\delta t/UT)$$

Where:

X designates the path point coordinates produced by the CNC and the subscripts k and k+1 designate, respectively, the present and target data

| | | |
|---|---|---|
| S | = | Change of position at update interval |
| | = | $X_{k+1} - X_k$ |
| $\delta t$ | = | sub-span interval |
| I | = | index indentifying the sub-interval for which position commands are being produced |
| UT | = | update interval |

The algorithm to produce position commands in accordance with the parabolic sub-span interpolation technique described herein is as follows:

$$POS\ CMD_I = X_{k-1}^*M1_I + X_k^*M2_I + X_{K+1}^*M3_I$$

Where:

X designates the path point coordinates produced by the CNC and the subscripts k, k-1, and k+1 designate, respectively, the present, previous and target data M1 = coefficient of the previous path point
M2 = coefficient of the present path point
M3 = coefficient of the target path point
I = index identifying the sub-interval for which position commands are calculated The newly created position commands POS CMD are stored in memory 78 for access by processor 80. Following completion of the execution of the sub-span interpolation routines, execution of the background programs is continued by return through terminal 330.

Figure 7B:
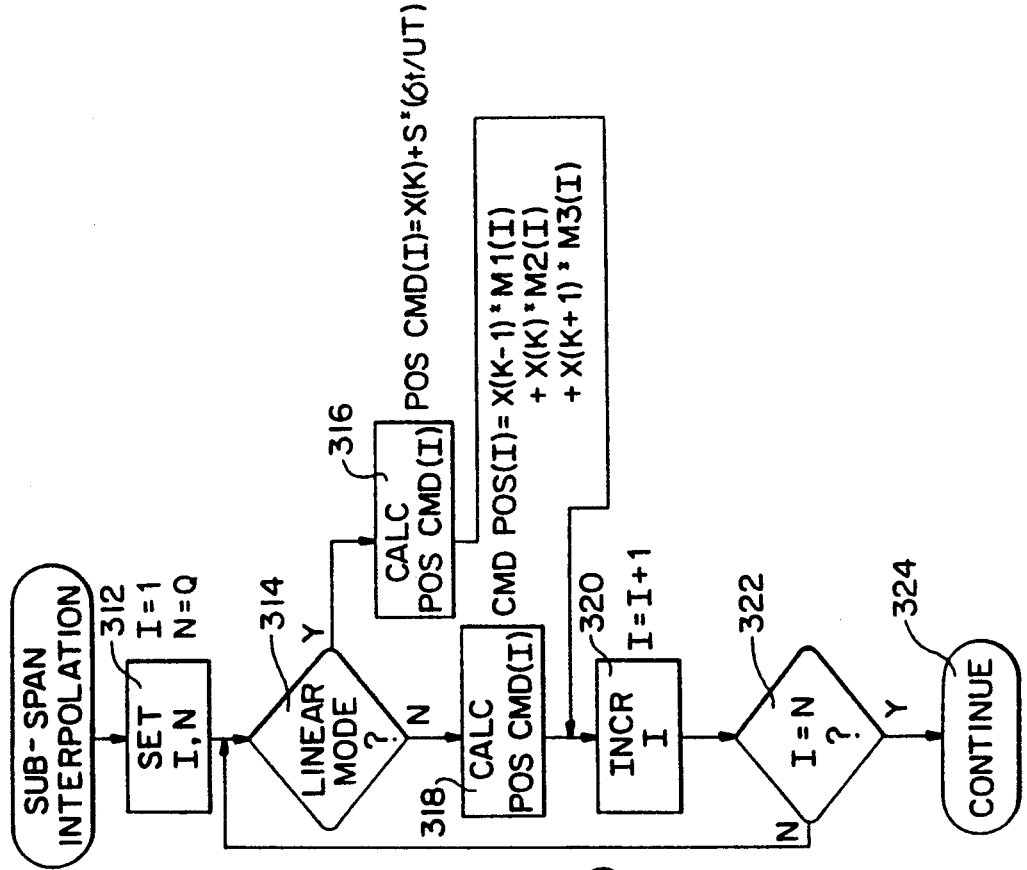
FIGS. 7a and 7b are flow charts of procedures executed in association with the sub-span interpolation processing of FIGS. 6a and 6b.
Figure 7A:
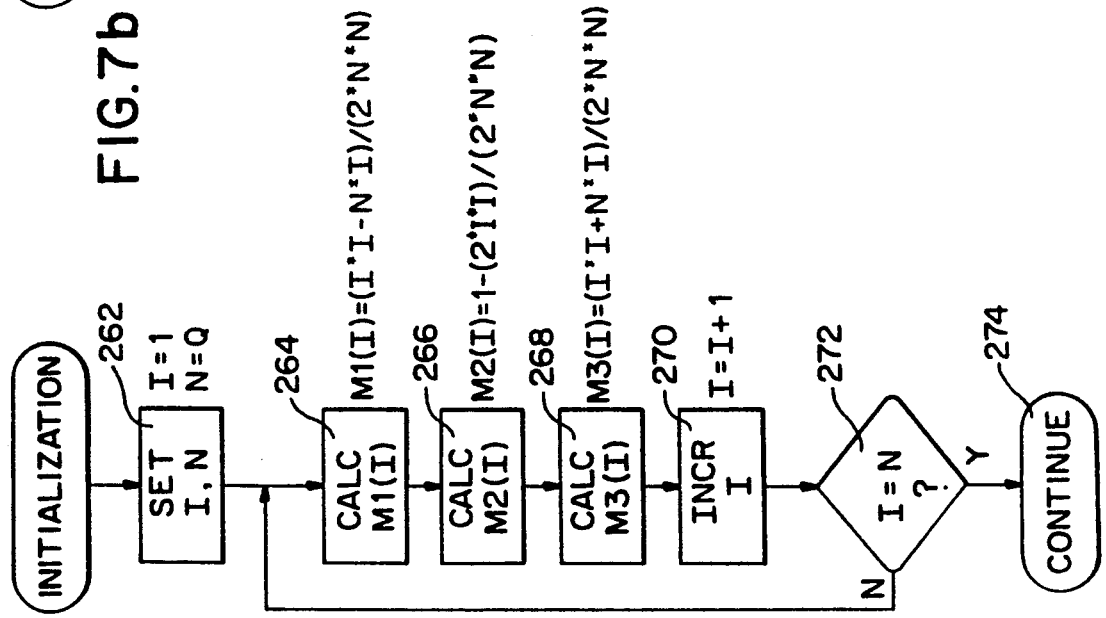

Description of the procedures executed by processor 86 to produce position commands in accordance with the algorithms described herein shall be given with reference to FIGS. 7a and 7b. A procedure for calculating values of coefficients used in equation (6) is illustrated by the flow chart of FIG. 7a. As previously stated, applicants have chosen to calculate and store the values of these coefficients for recall during execution of sub-span interpolation. The procedure of the flow chart of FIG. 7a is performed as part of the initialization procedure of process step 260 of the flow chart of FIG. 6a performed before execution of the background programs.

Referring to FIG. 7a at process step 262 an index I is set equal to one and a sub-increment count N is set equal to a predetermined number Q of sub-increments supplied, for example, from commissioning data store 64 of the CNC. At process step 264 the coefficient M1 of the previous path point is calculated and stored at a location identified by the index I. At process step 266 the coefficient M2 of the present path point is calculated and stored at a location identified by the index I. At process step 268 the coefficient M3 of the target path point is calculated and stored at a location identified by the index I. At process step 270 the index I is incremented by one. At decision step 272 the index is compared to the sub-increment count N and if equal execution of the initialization procedures is continued through terminal 274. If the value of index I is found to be less than the sub-increment count N at decision step 272, execution proceeds to process step 264. Values for the coefficients M1$_I$, M2$_I$ and M3$_I$ are calculated and stored in this manner for integer values of I from one to N.

With the values of the coefficients M1$_I$, M2$_I$ and M3$_I$ stored, execution of sub-span interpolation calculations may proceed in accordance with the procedure illustrated by the flow chart of FIG. 7b. This procedure is performed by processor 86 in connection with process step 310 of FIG. 6b. At process step 312 a sub-increment index I is set equal to one and a sub-increment count N is set equal to the predetermined number Q of sub-increments. At decision step 314 the CNC interpolation mode command flag is tested to determine whether linear or parabolic sub-span interpolation is to be performed. If linear sub-span interpolation is to be performed, calculation of the $I^{th}$ position commands POS CMD$_I$ occurs at process step 316 in accordance with the algorithm previously described. If parabolic sub-span interpolation is to be performed, calculation of $I^{th}$ position commands POS CMD$_I$ occurs at process step 318 by addition of products of the coefficients M1$_I$, M2$_I$ and M3$_I$ and, respectively, the past, present and target path point coordinates for each controlled axis. Following calculation of the position commands the index I is incremented by one at process step 320. At decision step 322 the index I is compared to the sub-increment count N and if equal, processing of the procedures of the flow chart of FIG. 6b continues through terminal 324. If the index I is less than the sub-increment count N, execution continues at process step 314 and calculation of the position commands POS CMD$_I$ continues in this manner for integer values of the index I from one to N.

As previously noted, the sub-span interpolation technique of the present invention is equally well suited to machines having pivoting movable members such as industrial robots. In general, the present invention is applicable to any control of motion of a machine member to effect motion along a path wherein the changes of position of the member with respect to time may be defined by a polynomial continuous through the successive path points defining the polynomial. Therefor, while the invention has been described with reference to control of a machine having members moving in translation to effect arcuate motion of a workpoint, this application is not to be regarded as a limitation of the invention which is defined by the appended claims and all equivalents thereto.

We claim:

1. A method for controlling motion of a machine comprising the steps of:
   a. storing sets of coefficient values defined by a predetermined parametric equation relating machine member position and time;
   b. periodically producing coordinates of machine member positions at points along a path at a first predetermined time interval;
   c. periodically calculating coordinates of machine member positions intermediate the path points at a predetermined sub-interval less than the predetermined time interval, the intermediate position coordinates being calculated as the sum of products of a predetermined number of successive machine member coordinates of path points and selected of the stored coefficient values; and
   d. moving the machine member through the intermediate coordinates at a rate defined by the predetermined sub-interval.

2. The method of claim 1 wherein the step of storing sets of coefficient values further comprises the steps of:
   a. producing a coefficient index signal;
   b. calculating values of a set of coefficients for a selected sub-interval identified by the index signal;
   c. storing the calculated set of coefficient values; and
   d. iterating steps a) through c) for a predetermined number of sets of coefficients.

3. The method of claim 2 wherein the parametric function is a parabola and each set of coefficients includes a coefficient for, respectively, a past, present and target machine member position coordinate.

4. A method for controlling motion of a machine member comprising the steps of:
   a. periodically producing coordinates of machine member positions at points along a path at a first predetermined time interval;
   b. periodically calculating coordinates of machine member positions intermediate the path points at a predetermined sub-interval less than the predetermined time interval, the intermediate position coordinates being calculated as the sum of products of machine member coordinates of path points and coefficients defined by a parametric function relating member position and time; and c. moving the machine member through the intermediate coordinates at a rate defined by the predetermined sub-interval.

5. The method of claim 4 wherein the step of calculating intermediate position coordinates further comprises the steps of:
   a. producing an index signal identifying a selected sub-interval for which intermediate position coordinates are to be calculated;
   b. producing a set of values of coefficients in response to the index signal; and
   c. calculating a product of each coefficient and a coordinate value of the machine member position at an associated path point.

6. The method of claim 5 wherein the parametric function is a parabola and each set of coefficients includes a coefficient for, respectively, a past, present, and target member position coordinate.

7. A method of controlling motion of a machine member comprising the steps of:
   a. producing a control signal defining a selected mode of sub-span interpolation;
   b. periodically producing coordinates of machine member positions at points along a path at a first predetermined time interval;
   c. periodically calculating coordinates of machine member positions intermediate the path points at a predetermined sub-interval less than the predetermined time interval, the intermediate position coordinates being calculated in response to:
      i. a linear function relating member position and time in response to the control signal defining a first mode of sub-span interpolation;
      ii. a nonlinear function relating member position and time in response to the control signal defining a second mode of sub-span interpolation;
   d. moving the machine member through the intermediate coordinates at a rate defined by the predetermined sub-interval.

8. The method of claim 7 wherein the step of calculating coordinates of intermediate positions further comprises the steps of:
   a. producing an index signal identifying a selected sub-interval for which intermediate position coordinates are to be calculated; and
   b. calculating the machine member position coordinate in response to the index signal and the selected function relating member position and time.

9. The method of claim 8 wherein the step of calculating the machine member position coordinate using a linear function further comprises the steps of:
   a. calculating an increment magnitude representing the change of position of the member on a straight line during the interval defined by the selected sub-interval; and
   b. adding the increment magnitude to the member position coordinate of a present path point.

10. The method of claim 8 wherein the step of calculating the machine member position coordinate using a nonlinear function further comprises the steps of:
   a. producing a set of values of coefficients in response to the index signal, the coefficients being defined by a parametric function relating member position and time;
   b. calculating a product of each coefficient and a coordinate value of the machine member position at an associated path point; and
   c. summing the products.

11. The method of claim 10 wherein the parametric function is a parabola and a product is calculated for, respectively, a past, present, and target path point member position coordinate.

12. A method for controlling motion of moveable members of a machine having a plurality of moveable members wherein motion of at least two members is to be coordinated to result in relative motion of a workpoint along a predetermined path, the path defined by successive path points separated one from another by a predetermined time interval defining a rate of change of position of the workpoint and represented by path point signals, the method comprising the steps of:
   a. producing coefficient signals defining member positions as a parametric function of time, wherein the parametric function is continuous through a predetermined number of the successive path points of each machine member;
   b. periodically producing, in response to the coefficient signals and the path point signals, intermediate coordinate signals representing the coordinates of member positions defined by the parametric function intermediate of the path points, the intermediate coordinate signals being separated by a predetermined sub-interval less than the predetermined time interval and invariant with the rate of change of position; and
   c. moving the machine members to the positions defined by the intermediate coordinate signals at a rate defined by the sub-interval.

13. The method of claim 12 wherein the step of producing coefficient signals further comprises the steps of:
   a. producing a coefficient index signal defining a selected set of coefficients of a predetermined number of sets of coefficients, each set of coefficients marking a sub-interval between the extreme path points; and
   b. producing the coefficient signals in response to the coefficient index signal.

14. The method of claim 13 wherein the parametric function is a parabola joining three successive path points.

15. The method of claim 14 wherein positions intermediate a member present position and a member target position are periodically computed as the sum of products of coefficients and respectively machine member past, present, and target positions.

16. An apparatus for controlling motion of a machine member comprising:
   a. means for periodically producing coordinates of positions of the machine member along a predetermined path at a first predetermined interval;
   b. means for periodically calculating coordinates of machine member positions intermediate the path points at a predetermined sub-interval less than the predetermined time interval, the intermediate position coordinates being calculated as the sum of products of machine member coordinates of path points and coefficients defined by a parametric function relating member position and time; and
   c. means for moving the machine member through the intermediate coordinates at a rate defined by the predetermined sub-interval.

17. The apparatus of claim 16, wherein the means for periodically calculating coordinates of machine member positions further comprises:

a. means for producing an index signal identifying a selected sub-interval for which intermediate position coordinates are to be calculated;
b. means for producing a set of values of coefficients in response to the index signal; and
c. means for calculating a product of each coefficient and a coordinate value of the machine member position at an associated path point.

18. The apparatus of claim 17 wherein the parametric function is a parabola and the product calculating means calculates a product for each of a past, present, and target member position coordinate.

19. An apparatus for controlling motion of a machine member comprising:
a. means for producing a control signal defining a selected mode of sub-span interpolation;
b. means for periodically producing coordinates of machine member positions at points along a path at a first predetermined time interval;
c. means for periodically calculating coordinates of machine member positions intermediate the path points at a predetermined sub-interval less than the predetermined time interval, the intermediate position coordinates being calculated in response to:
  i. a linear function relating member position and time in response to the control signal defining a first mode of sub-span interpolation;
  ii. a nonlinear function relating member position and time in response to the control signal defining a second mode of sub-span interpolation;
d. means for moving the machine member through the intermediate coordinates at a rate defined by the predetermined sub-interval.

20. The apparatus of claim 19 wherein the means for calculating coordinates of intermediate positions further comprises:
a. means for producing an index signal identifying a selected sub-interval for which intermediate position coordinates are to be calculated; and
b. means for calculating the machine member position coordinate in response to the index signal and the selected function relating member position and time.

21. The apparatus of claim 20 wherein the means for calculating the machine member position coordinate using a linear function further comprises:
a. means for calculating an increment magnitude representing the change of position of the member on a straight line during the interval defined by the selected sub-interval; and
b. means for adding the increment magnitude to the member position coordinate of a present path point.

22. The apparatus of claim 21 wherein the means for calculating the machine member position coordinate using a nonlinear function further comprises:
a. means for producing a set of values of coefficients in response to the index signal, the coefficients being defined by a parametric function relating member position and time;
b. means for calculating a product of each coefficient and a coordinate value of the machine member position at an associated path point; and
c. means for summing the products.

23. The apparatus of claim 22 wherein the parametric function is a parabola and means for calculating products calculates a product for, respectively, a past, present, and target path point member position coordinate.

24. An apparatus for controlling motion of a machine member comprising:
a. means for storing sets of coefficient values defined by a predetermined parametric equation relating machine member position and time;
b. means for periodically producing coordinates of machine member positions at points along a path at a first predetermined time interval;
c. means for periodically calculating coordinates of machine member positions intermediate the path points at a predetermined sub-interval less than the predetermined time interval, the intermediate position coordinates being calculated as the sum of products of machine member coordinates of path points and selected of the stored coefficients; and
d. means for moving the machine member through the intermediate coordinates at a rate defined by the predetermined sub-interval.

25. The apparatus of claim 24 wherein the means for storing sets of coefficient values further comprises:
a. means for iteratively producing a coefficient index signal;
b. means for calculating values of a set of coefficients for a selected sub-interval identified by the index signal; and
c. means for storing the calculated set of coefficient values.

26. The apparatus of claim 24 wherein the parametric function is a parabola and the means for calculating values of sets of coefficients includes means for calculating coefficients for, respectively, a past, present and target machine member position coordinate.

27. An apparatus for controlling motion of a moveable member of a machine having a plurality of moveable members wherein motion of at least two members is to be coordinated to result in relative motion of a workpoint along a predetermined path, the path defined by successive path points separated one from another by a predetermined time interval defining a rate of change of position of the workpoint and represented by path point signals, the apparatus comprising:
a. means for producing coefficient signals defining member positions as a parametric function of time, wherein the parametric function is continuous through a predetermined number of the successive path points of each machine member;
b. means for periodically producing, in response to the coefficient signals and the path point signals, intermediate coordinate signals representing the coordinates of member positions defined by the parametric function intermediate of the path points, the intermediate coordinate signals being separated by a predetermined sub-interval less than the predetermined time interval and invariant with the rate of change of position; and
c. means for moving the machine members to the positions defined by the intermediate coordiante signals at a rate defined by the sub-interval.

28. The apparatus of claim 27 wherein the means for producing coefficient signals further comprises:
a. means for producing a coefficient index signal defining a selected set of coefficients of a predetermined number of sets of coefficients, each set of coefficients marking a sub-interval between the extreme path points; and
b. means for producing the coefficient signals in response to the coefficient index signal.

29. The apparatus of claim 28 wherein the parametric function is a parabola joining three successive path points and the means for producing coefficient signals includes means for producing coefficients for, respectively, a past, present, and target path point.

30. The apparatus of claim 29 wherein the means for producing intermediate position coordinate signals periodically computes the sum of products of coefficients and respectively machine member past, present, and target positions.

31. A method for controlling motion of a moveable machine member to effect motion of a workpoint along a predetermined path, the method comprising the steps of:
   a. periodically producing machine member position commands at a predetermined time interval, the machine member position commands defining path points through which the workpoint is to be moved;
   b. periodically calculating coordinates of machine member positions intermediate the position commands and separated by a sub-interval of time less than the predetermined time interval, the coordinates of intermediate positions of the machine member being calculated according to a parabolic function of time defined by a sum of products of successive position commands and time dependent coefficients, the successive position commands corresponding to preceding, present and target path points; and
   moving the machine member through the intermediate coordinates at a rate defined by the sub-interval.

32. The method of claim 31 wherein the step of calculating intermediate position coordinates further comprises the steps of:
   a. producing an index signal identifying a selected sub-interval for which intermediate position coordinates are to be calculated;
   b. producing a set of values of coefficients in response to the index signal, the coefficients being defined by the parabolic function and each coefficient being associated with one of the successive position commands;
   c. calculating a product of each coefficient and a coordinate value of the machine member position of the associated position command; and
   d. summing the products.

33. An apparatus for controlling motion of a machine member to effect motion of a workpoint along a predetermined path, the apparatus comprising:
   a. means for periodically producing machine member position commands at a predetermined time interval, the machine member position commands defining path points through which the workpoint is to be moved;
   b. means for periodically calculating coordinates of machine member positions intermediate the position commands and separated by a sub-interval of time less than the predetermined time interval, the intermediate position coordinates being calculated according to a parabolic function of time defined by a sum of products of successive position commands and time dependent coefficients, the successive position commands corresponding to preceding, present and target path points; and
   c. means for moving the machine member through the intermediate coordinates at a rate defined by the sub-interval.

34. The apparatus of claim 33 wherein the means for calculating intermediate position coordinates further comprises:
   a. means for producing an index signal identifying a selected sub-interval for which intermediate position coordinates are to be calculated;
   b. means for producing a set of values of coefficients in response to the index signal, the coefficients being defined by the parabolic function and each coefficient being associated with one of the successive position commands;
   c. means for calculating a product of each coefficient and a coordinate value of the machine member position of the associated position command; and
   d. means for summing the products.

* * * * *